(12) United States Patent
Heber et al.

(10) Patent No.: US 12,147,123 B2
(45) Date of Patent: Nov. 19, 2024

(54) METHOD AND ARRANGEMENT FOR INFLUENCING LIGHT PROPAGATION DIRECTIONS

(71) Applicant: siOPTICA GmbH, Jena (DE)

(72) Inventors: André Heber, Weimar (DE); Andreas Bregulla, Duderstadt (DE)

(73) Assignee: siOPTICA GmbH, Jena (DE)

( * ) Notice: Subject to any disclaimer, the term of this patent is extended or adjusted under 35 U.S.C. 154(b) by 241 days.

(21) Appl. No.: 17/758,614

(22) PCT Filed: Mar. 16, 2021

(86) PCT No.: PCT/EP2021/056653
§ 371 (c)(1),
(2) Date: Jul. 11, 2022

(87) PCT Pub. No.: WO2021/190997
PCT Pub. Date: Sep. 30, 2021

(65) Prior Publication Data
US 2023/0028201 A1    Jan. 26, 2023

(30) Foreign Application Priority Data

Mar. 26, 2020    (DE) .................... 10 2020 002 052.6

(51) Int. Cl.
*G02F 1/1335* (2006.01)
*G02B 30/31* (2020.01)
*G02F 1/13* (2006.01)

(52) U.S. Cl.
CPC ....... *G02F 1/133626* (2021.01); *G02B 30/31* (2020.01); *G02F 1/1323* (2013.01)

(58) Field of Classification Search
CPC .................................................... G02F 1/1323
See application file for complete search history.

(56) References Cited

U.S. PATENT DOCUMENTS

| 5,956,107 A | 9/1999 | Hashimoto et al. |
| 2007/0008456 A1 | 1/2007 | Lesage et al. |

(Continued)

FOREIGN PATENT DOCUMENTS

| CN | 1651981 A | 8/2005 |
| CN | 1987606 A | 6/2007 |

(Continued)

*Primary Examiner* — Alexander P Gross
(74) *Attorney, Agent, or Firm* — Christensen, Fonder, Dardi & Herbert PLLC

(57) ABSTRACT

A method for influencing light propagation directions of a plurality of illuminated surfaces, comprising: arranging switchable absorbers on the light-exit side of the surfaces, such that light only exits through portions of the surfaces which are in front of the surfaces; switching on the absorbers for a first operating state so that a portion of the light emanating from the surfaces is absorbed, while the rest of the light exits at the surface portions of the light-exit side of the surface substrates at which no switchable absorbers are applied, resulting in light only being visible from a limited viewing angle which is defined by the shape of the switchable absorber, the shape of the surface, refractive index conditions in, and thickness of, the substrates of the surfaces; and switching off the absorbers for a second operating state so that light from the surfaces is visible from an unrestricted viewing angle.

18 Claims, 5 Drawing Sheets

(56) References Cited

U.S. PATENT DOCUMENTS

| | | |
|---|---|---|
| 2007/0030240 A1 | 2/2007 | Sumiyoshi et al. |
| 2007/0171193 A1* | 7/2007 | Nakamura ............ G02F 1/1323 |
| | | 345/156 |
| 2008/0079866 A1 | 4/2008 | Mimura et al. |
| 2008/0144179 A1 | 6/2008 | Mimura et al. |
| 2008/0231952 A1 | 9/2008 | Kim |
| 2010/0208170 A1 | 8/2010 | Tanoue et al. |
| 2014/0226093 A1 | 8/2014 | Schwartz et al. |
| 2016/0011441 A1 | 1/2016 | Schwartz et al. |
| 2016/0054601 A1 | 2/2016 | Kitamura et al. |
| 2018/0259799 A1 | 9/2018 | Kroon |
| 2018/0267344 A1 | 9/2018 | Wu |
| 2019/0171080 A1 | 6/2019 | Wu et al. |
| 2019/0353943 A1 | 11/2019 | Smith et al. |

FOREIGN PATENT DOCUMENTS

| | | | |
|---|---|---|---|
| CN | 101004871 A | 7/2007 | |
| CN | 107734118 A | 2/2018 | |
| CN | 109445164 A | 3/2019 | |
| DE | 102015012271 A1 | 4/2017 | |
| DE | 10 2019 003 383 A1 | 11/2019 | |
| JP | 2007219486 A | 8/2007 | |
| JP | 2008009061 A | 1/2008 | |
| JP | 2008089728 A | 4/2008 | |
| JP | 2008107404 A | 5/2008 | |
| JP | 2009-110765 A | 5/2009 | |
| JP | 2016045429 A | 4/2016 | |
| KR | 10-2008-0043601 A | 5/2008 | |
| KR | 1001257931 | 5/2008 | |
| KR | 20080043601 A * | 5/2008 | |
| KR | 10-1257931 B1 | 4/2013 | |
| WO | WO-2014125793 A1 * | 8/2014 | ......... G02B 27/2214 |

* cited by examiner

METHOD AND ARRANGEMENT FOR INFLUENCING LIGHT PROPAGATION DIRECTIONS

PRIORITY CLAIM

The present application is a National Phase entry of PCT Application No. PCT/EP2021/056653, filed Mar. 16, 2021, which claims priority to German Patent Application No. 10 2020 002 052.6, filed Mar. 26, 2020, the disclosures of which are hereby incorporated by reference herein in their entirety.

FIELD OF THE INVENTION

In recent years, great strides have been made toward widening the visual angle in LCDs and OLEDs. However, there are often situations in which this very large viewing area in a display screen may be disadvantageous. Increasingly, information such as bank data or other personal information and sensitive data is also available on mobile devices, such as notebooks, mobile phones and tablets. Accordingly, there is a need to control whom may see these sensitive data. It should be possible to choose a wide viewing angle for sharing information on a display with others, e.g., when viewing vacation photographs or for advertising purposes. On the other hand, a small viewing angle is required when it is desirable to treat the displayed information confidentially.

A similar problem arises in automotive engineering. In this case, the driver must not be distracted by image contents, such as, e.g., digital entertainment programs, when the engine is operating, while the passenger would like to view the same also during the drive. Consequently, a display screen is required which can switch between the corresponding display modes.

DESCRIPTION OF THE PRIOR ART

Add-on films based on microlouvers have already been used for mobile displays in order to protect visible data. However, these films were not switchable/convertible; they always had to be manually applied first and then removed again subsequently. They also had to be transported separately from the display when not immediately needed. A further substantial drawback in the use of such louvered films is connected to the light losses entailed.

U.S. Pat. No. 5,956,107 A discloses a switchable light source with which a display screen can be operated in a plurality of modes. A drawback consists in that all of the outcoupling of light relies on scattering and, therefore, only low efficiency and suboptimal light direction effects are achieved. In particular, it is not disclosed in more detail how to achieve a focused light cone.

CN 107734118 A discloses a display screen which renders the viewing angle of a display screen controllable by means of two backlights. The upper backlight of these two backlights should emit focused light for this purpose. In particular, a grating with opaque portions and transparent portions is mentioned as an embodiment to this end. Presumably, as a result of this, the light of the second backlight which must pass through the first backlight in direction of an LCD panel is also focused and, consequently, the public viewing mode which is actually provided for a wide viewing angle suffers an appreciable narrowing of angle.

US 2007/030240 A1 describes an optical element for controlling the light propagation direction of light originating from a backlight. This optical element requires, for example, liquid crystals in the form of PDLCs, which is expensive on the one hand and poses a safety risk on the other hand especially for consumer applications because PDLC liquid crystals generally require voltages higher than 60 V for their circuitry.

CN 1987606 A in turn describes a display screen which renders the viewing angle of a display screen controllable by means of two backlights. In particular, a "first light plate" is used. This first light plate must be wedge-shaped in order to allow the light to be coupled out in a focused manner as intended. Exact details for achieving the focused light outcoupling with appropriate angle conditions are not disclosed.

Further, US 2018/0267344 A1 describes a setup with two flat illumination modules. In this case, the light of the illumination module located in the rear with respect to the viewing direction is focused through a separate structure. After focusing, the light must still pass the front illumination module which has scattering elements. Accordingly, a sharp light focusing cannot be implemented in an optimal manner for protected viewing.

Lastly, US 2007/0008456 A1 discloses dividing a light emission angle into at least three regions, light impinging on two of these three regions in general. It follows from this that a protected view for which a display illuminated in this way is used is not observable exclusively from one direction.

The methods and arrangements mentioned above generally share the drawback that they appreciably reduce the brightness of the basic display screen and/or require an active, or at least a special, optical element for mode switching and/or require a complicated and expensive production and/or reduce the resolution in the public viewing mode and/or only allow poor viewing protection.

SUMMARY OF THE INVENTION

Therefore, it is the object of the invention to describe a method and an arrangement for influencing light propagation directions. The method shall be implementable so as to be inexpensive and suitable for mass production and, in particular, is universally usable with OLED display screens as well as with other types of display screen in order to enable switching between a privacy viewing mode and a public viewing mode, and the resolution of such a display screen shall not be substantially reduced.

This object is met according to the invention by a method for influencing the light propagation directions of a plurality of adjacent self-luminous and/or illuminated surfaces (F1, F2, . . . ) which comprise a transparent substrate on the light exit side. In a first alternative, every surface has its own substrate or, in a second alternative, a plurality of, or all of, the surfaces (F1, F2, . . . ) share a substrate in common. The aforementioned substrate is arranged above, but not necessarily directly above, the layer of the self-luminous or illuminated surfaces (F1, F2, . . . ) which generates the light. Proceeding therefrom, the method according to the invention includes the following steps:

arranging switchable absorbers on the light exit side for at least a quantity of surfaces (F1, F2, . . . ) on one or more partial surfaces of the respective substrate in the first alternative or on one or more partial surfaces of the common substrate in the second alternative, the main spatial direction of propagation of these switchable absorbers lying parallel to the light exit surface of the substrate or substrates to within a tolerance of a maximum of 10°, limiting the light propagations of the light emanating from each individual surface (F1, F2, . . . ) in such a way that light of a surface (F1, F2, . . . ) does not exit through the substrate or the portion of a substrate that is located in front of another surface in parallel projection, but only exits through the substrate portion which, in parallel projection, is located exclusively in front of the surface under consideration, switching on the absorbent effect of the switchable absorbers for a first operating state B1 so that a portion of the light emanating from the surfaces (F1, F2, . . . ) is absorbed, while the rest of the light exits freely at the surface portions of the light exit side of the substrate on which no switchable absorbers are applied so that the light of the respective relevant surfaces (F1, F2, . . . ) is only visible from a limited viewing angle which is defined in particular by the geometric shape of the switchable absorber, the geometric shape of the respective surface (F1, F2, . . . ), the refractive index conditions in the setup and the thickness of the substrate, switching off the absorbent effect of the switchable absorbers for a second operating state B2 so that the light emanating from the surfaces (F1, F2, . . . ), with the exception of residual absorption losses of the switchable absorbers, can propagate freely through same, as a result of which the light of the relevant surfaces (F1, F2, . . . ) is, in each instance, visible from an unrestricted observation angle (but at least from a larger viewing angle than in operating state B1).

In this first variant of the invention, as also in all of the following variants, a "limited viewing angle" does not necessarily mean that no light at all is emitted in certain directions. On the contrary, a certain residual light can also be emitted, although it hampers comfortable viewing. Typical values for such residual light (measured as luminance), even in zones intended for the limited view, are a few percent, generally 1% to 5% at most, of the peak value (which is the maximum perceptible from the dedicated viewing zone of the limited viewing angle).

In the first alternative, each surface (F1, F2, . . . ) comprises its own substrate (1.1, 1.2, 1.3, etc., respectively). These substrates are then preferably arranged substantially in a plane. In contrast, in the second alternative, it is also possible that all of the surfaces (F1, F2, . . . ) comprise a common, two-dimensionally extensive substrate. Further, a plurality of clusters of surfaces (F1, F2, . . . ) can comprise a substrate, in which case a plurality of substrates are provided.

In particular, it is possible either to switch the switchable absorbers associated with all of the surfaces (F1, F2, . . . ) simultaneously for switching between operating states B1 and B2 over the full surface area or to carry out switching between operating states B1 and B2 over only part of the surface area in that only a proper subset of the switchable absorbers is switched.

The common substrate or the individual substrates, respectively, may be seen as transparent spacers made of glass or from a polymer, for example. Similarly, such a substrate may also be an integral component part of an imaging system, for example the substrate of an OLED pixel or OLED panel, or the substrate of an LCD panel. However, if a separate substrate, for example, an OLED panel or LCD panel, is already present, this separate substrate is the common substrate described in this invention or the individual substrates are additional optical layers. As a rule, a substrate used in this invention can have a thickness of a few micrometers to approximately 1 millimeters or a few millimeters depending on the construction.

The limiting of the light propagations of the light emanating from each individual surface (F1, F2, . . . ) is carried out, for example, by arranging permanently or switchably absorbent layers between the individual substrates in the first alternative or inside of the one common substrate in the second alternative, and the planes in which the switchable absorbers and the absorbent layers are arranged, respectively, preferably extend perpendicular to one another to within a tolerance of, at most, 25 degrees.

Alternatively, it is contemplated that the limiting of the light propagations of the light emanating from each individual surface (F1, F2, . . . ) is carried out by selecting the refractive index conditions of the substrate relative to air in such a way that unwanted rays in direction of respective adjacent partial surfaces are converted into total reflection and accordingly—in the basic configuration—are extinguished for the light balance. In practice, an absorber will then generally be applied to the narrow sides of the substrate in order to absorb this light.

In a further embodiment of the invention, a collimating lens is arranged on the partial surfaces of the substrates or substrate on which no switchable absorber is applied in order to achieve a further beam focusing and better enable the limiting of the viewing angle.

Every switchable absorber can comprise, for example, an electrochromic layer and/or a liquid crystal layer and/or an electrophoresis-based layer and/or a layer based on electrowetting with absorbent particles and/or a PDLC (polymer dispersed liquid crystal) layer which switches between opaque and transparent and can be controlled by an electric field.

In a further alternative, it is possible that every switchable absorber comprises a switchable color filter by which the color spectrum of the color emitted through a surface (F1, F2, . . . ) thereunder is absorbed in a first state and transmitted in a second state, and the switchable color filter can be controlled with respect to its state by an electric field.

Every switchable absorber preferably has the geometry of a pinhole diaphragm. It can be round, polygonal and, in particular, rectangular, for example. The order of magnitude of the surface area of the switchable absorbers is generally about 25% to 90% of a self-luminous or illuminated surface (F1, F2, . . . ). In absolute numbers, this amounts to several dozens of square micrometers to a few square millimeters or even square centimeters, depending on the configuration of the surfaces (F1, F2, . . . ). Other configurations are also possible.

For certain embodiments of the invention, geometries of inverse pinhole diaphragms are also possible. In an inverse pinhole diaphragm of this kind, those partial surfaces or zones of a substrate which would not otherwise be covered with a switchable absorber compared to a non-inverse pinhole diaphragm are covered with a switchable absorber, and vice versa.

The method according to the invention acquires special practical significance when a multitude of self-luminous surfaces (F1, F2, . . . ) are provided, each of which corresponds to a smallest pixel (single-color/monochromatic, e.g., red, green or blue, or solid color) or clusters of smallest pixels of an OLED display screen, mini-LED display screen, VCSEL display screen, QLED display screen, LED display screen or micro-LED display screen so that such a display screen can be switched between an operating state B1 for a limited viewing angle and an operating state B2 for an unrestricted viewing angle. In other words, the plurality of illuminated or self-luminous surfaces (F1, F2, . . . ) in their entirety form the aforementioned display screen.

In case of clusters of smallest pixels as self-luminous or illuminated surfaces F1, F2, . . . , it is also contemplated that one or more pixels are divided over the surface area thereof in two different adjacent clusters of this kind. In other words, two self-luminous or illuminated surfaces F1, F2, . . . can also share a smallest pixel of a display screen. This is particularly relevant when the method according to the invention is to be applied to a display screen panel as finished product, for example, an OLED panel or LCD panel, so that the substrate with the switchable absorbers is not applied until afterwards.

Generally, the display screen technology can be self-luminous or illuminated, such as, for example, also LCDs, SEDs, FEDs or others. In case of an LCD panel, this LCD panel is generally backlit by an area-controllable light source. However, it is also possible in this case to use a direct backlight, as it is called, which allows locally varying illumination strengths. In this case, a cluster of pixels is illuminated by separately controllable LEDs. The method according to the invention can also be employed here.

Further, it is possible that a planar illumination source, such as an LCD backlight (direct backlight or controllable over the full surface area), is divided into individual surfaces F1, F2, . . . (e.g., vertical stripes or a two-dimensional grid) in such a way or comprises self-luminous or illuminated surfaces F1, F2, . . . in such a way that the method according to the invention can be implemented thereon. This results in a backlight which emits light either in a limited viewing angle or in an unrestricted viewing angle. If a backlight of this kind is used behind an LCD panel with respect to viewing direction, this LCD panel can be switched between an operating state B1 for a limited viewing angle and an operating state B2 for an unrestricted viewing angle.

Accordingly, the invention also comprises the use of a planar illumination source comprising self-luminous or illuminated surfaces (F1, F2, . . . ) for backlighting an LCD panel so that the LCD panel can be operated in a first operating state B1 for a limited viewing angle and in a second operating state B2 for an unrestricted viewing angle.

In a further advantageous configuration, every switchable absorber has the geometry of a pinhole diaphragm. Depending on the application, it may be advantageous that the pinhole diaphragms are arranged on the partial surface or the partial surfaces of the common substrate or of the respective substrate such that the geometric centroids of the self-luminous or illuminated surfaces F1, F2, . . . and of the surface portions not covered by the switchable absorbers do not coincide with one another in parallel projection at least in some of the surfaces F1, F2, . . . . In this way, the limited light propagation directions of the individual surfaces F1, F2, . . . can be varied, namely, in an especially advantageous manner such that, when the surfaces F1, F2, . . . are viewed by an observer, the surfaces F1, F2, . . . at the left-hand edge radiate or emit light toward the right-hand side, i.e., toward the observer, and the surfaces F1, F2, . . . at the right-hand edge radiate or emit light toward the left-hand side, i.e., again toward the observer. An improved homogeneity can be achieved in this way in spite of limited light directions.

In a further embodiment, each switchable absorber has the geometry of an inverse pinhole diaphragm. As has already been mentioned, with an inverse pinhole diaphragm of this kind, compared with a non-inverse pinhole diaphragm, those partial surfaces or zones of a substrate which would not otherwise be covered with a switchable absorber are covered with a switchable absorber, and vice versa.

Accordingly, in this configuration, in which a switchable absorber is arranged substantially facing the self-luminous or illuminated surfaces F1, operating state B1 is produced for a limited mode. The light emitted from the surface F1 is now absorbed by the switchable absorber. However, rays which are still totally internally reflected in the substrate arrive inside the substrate spatially adjacent to the absorber. Additionally, microstructured outcoupling elements which couple the above-mentioned totally internally reflected rays out of the common substrate or respective substrate accompanied by a change in direction are arranged on partial surfaces not covered by the absorbers. The light coupled out through the microstructured outcoupling elements is only visible from the limited viewing angle.

In contrast, when this arrangement is switched to operating state B2, i.e., when the absorber is switched to transparent, an observer is reached not only by light due to the outcoupling elements but also directly by the light of surface F1 which—except for losses due to technical reasons—can now pass the absorber.

Lastly, the invention can be further developed in that permanently scattering microstructures are arranged on the switchable absorbers. The use of permanently scattering microstructures on the switchable absorbers provides effective means for all of the configurations of the invention to optimize the light distribution particularly for operating state B2.

The scattering microstructures do not take effect in operating state B1 because the absorbers are switched to absorb in operating state B1 and, therefore, effectively no light, or virtually no light, of a surface F1 reaches the scattering microstructures.

In contrast, in operating state B2 in which the switchable absorbers are switched to transparent, the scattering microstructures scatter light reaching the switchable absorbers from totally internally reflected light (and, depending on the position of the absorbers) possibly also light directly from the surface F1 in order to optimize the light distribution through scattering, particularly for operating state B2.

It is also contemplated that further operating states B3, B4, etc. are adjustable in which the switchable absorbers are switched to a partially absorbent state, for example, to make light perceptible from the side only conditionally because of reduced brightness.

In particular, it is advantageous for special cases of application that, in two operating states B5 and B6, mutually complementing portions of the switchable absorbers are switched to absorbent and switched to transmissive in a complementary manner. In an exemplary embodiment, half of the absorbers can be switched to absorb and the other half can be switched to transmit in operating state B5. The switching is then inverted for operating state B6, i.e., the first half of the absorbers is switched to transmit and the second half of the absorbers is switched to absorb. Further, at least two switchable absorbers are to be provided per pixel in this case, one switchable absorber belonging to the first half and the other switchable absorber belonging to the second half. It is then possible, e.g., to alternately release the light of the surfaces in one direction and then in another direction in a cyclical timing of operating states B5 and B6. In other words, the two switchable operating states B5 and B6 are cycled through for a temporal-sequential influencing of the light direction. This can be utilized, for example, to generate images in two different directions, for example, in order that two different images which are displayed sequentially in time because of the method according to the invention are projected consecutively and cyclically in different directions. If this is performed fast enough, i.e., above the flicker fusion rate of the human eye, then, depending on the direction preset and image contents, either autostereoscopic displays (both eyes of an observer see two different images quasi-simultaneously) or two different images for two different observers (so-called dual view) are made possible simultaneously on the surfaces F1, F2, . . . .

In other words, a method for influencing the light propagation directions of a plurality of adjacent self-luminous and/or illuminated surfaces F1, F2, . . . is used in this embodiment, in which method the surfaces F1, F2, . . . comprise a transparent substrate on the light exit side, this substrate being arranged above the light-generating layer of the self-luminous or illuminated surfaces F1, F2, . . . , and, in a first alternative, every surface F1, F2, . . . comprises its own substrate and, in a second alternative, all of the surfaces F1, F2, . . . comprise a common, two-dimensionally extensive substrate, having the following steps:

for at least a quantity of surfaces F1, F2, . . . , arranging switchable absorbers on the light exit side on one or more partial surfaces of the respective substrate in the first alternative or on one or more partial surfaces of the common substrate in the second alternative, the main spatial direction of propagation of these switchable absorbers lying parallel to the light exit surface of the substrate or substrates to within a tolerance of a maximum of 10°, and at least two separately switchable absorbers are provided in front of every surface F1, F2, . . . and can be switched, respectively, to transparent and opaque so as to complement one another, limiting the light propagations of the light emanating from each individual surface F1, F2, . . . in such a way that light of a surface F1, F2, . . . does not exit through the substrate or the portion of a substrate which is located in front of another surface in parallel projection, but only exits through the substrate portion which, in parallel projection, is located exclusively in front of the surface under consideration, switching on the absorbent effect of a selection of switchable absorbers and switching on the transparent effect of the selection of switchable absorbers complementing the aforementioned selection of switchable absorbers for an operating state B5 so that a portion of the light emanating from the surfaces F1, F2, . . . is absorbed, while the rest of the light exits freely at the surface portions of the light exit side of the substrate at which no switchable absorbers are applied or an absorber switched to transparent is applied, as a result of which the light of the respective relevant surfaces F1, F2, . . . is only visible from a first limited viewing angle which is defined in particular by selection and the geometric shape of the switchable absorbers, the geometric shape of the respective surface F1, F2, . . . , the refractive index conditions in the setup, and the thickness of the substrate, switching on the transparent effect of the aforementioned selection of switchable absorbers and switching on the absorbent effect of the selection of switchable absorbers complementing the aforementioned selection of switchable absorbers for an operating state B6 so that a portion of the light emanating from the surfaces F1, F2, . . . is absorbed, while the rest of the light exits freely at the surface portions of the light exit side of the substrate at which no switchable absorbers are applied or an absorber switched to transparent is applied, so that the light of the respective relevant surfaces F1, F2, . . . is only visible from a second limited viewing angle which is defined in particular by the selection and the geometric shape of the switchable absorbers, the geometric shape of the respective surface F1, F2, . . . , the refractive index conditions in the setup, and the thickness of the substrate, operating states B5 and B6 are switched on one after the other in a cyclically timed manner, and at least two different image contents are displayed on the surfaces F1, F2, . . . alternately in the same cyclical timing, so that an autostereoscopic display or a dual view display is achieved on the surfaces F1, F2, . . . depending on the first limited viewing angle and second limited viewing angle and depending on the image contents displayed.

In a corresponding configuration with more than two switchable absorbers for each surface F1, F2, . . . , it is also possible in principle to show more than two images in a temporally sequential manner in more than two directions. This makes possible so-called multi-view 3D systems in which a certain kind of panoramic view is also made possible during head movement.

The object of the invention is also met by an arrangement according to the invention for influencing the light propagation directions, comprising:

a plurality of adjacent self-luminous and/or illuminated surfaces (F1, F2, . . . ) which comprise a transparent substrate on the light exit side, the aforementioned substrate being arranged above the layer of the self-luminous or illuminated surfaces (F1, F2, . . . ) which generates light, and, in a first alternative, every surface (F1, F2, . . . ) has its own substrate and, in a second alternative, all of the surfaces (F1, F2, . . . ) comprise a common, two-dimensionally extensive substrate, for at least a quantity of surfaces (F1, F2, . . . ), switchable absorbers arranged on the light exit side on one or more partial surfaces of the respective substrate in the first alternative or on one or more partial surfaces of the common substrate in the second alternative, the main spatial direction of propagation of these switchable absorbers lying parallel to the light exit surface of the substrate or substrates to within a tolerance of a maximum of 10°, means for limiting the light propagations of the light emanating from each individual surface (F1, F2, . . . ), such as a light limiter, such that light of a surface (F1, F2, . . . ) does not exit through the substrate or the portion of a substrate that is located in front of another surface in parallel projection, but only exits through the substrate portion which, in parallel projection, is located exclusively in front of the surface under consideration, means for switching on and switching off the absorbent effect of the switchable absorbers such that the absorbent effect of the switchable absorbers is switched on for a first operating state B1 so that a portion of the light emanating from the surfaces (F1, F2, . . . ) is absorbed, while the rest of the light exits freely at the surface portions of the light exit side of the substrate at which no switchable absorbers are applied, so that the light of the respective relevant surfaces (F1, F2, . . . ) is only visible from a limited viewing angle which is defined in particular by the geometric shape of the switchable absorber, the geometric shape of the respective surface (F1, F2, . . . ), the refractive index conditions in the setup and the thickness of the substrate, and so that the absorbent effect of the switchable absorbers is switched off for a second operating state B2 so that the light emanating from the surfaces (F1, F2, . . . )—with the exception of residual absorption losses of the switchable absorbers—can propagate freely through same, as a result of which the light of the respective relevant surfaces (F1, F2, . . . ) is visible from an unrestricted viewing angle.

The above-mentioned configuration variants and interrelationships of means and effect of the method according to the invention apply analogously here and are not described again so as to avoid repetition.

The performance capability of the invention is basically retained if the above-described parameters are varied within certain limits.

It will be understood that the features mentioned above and those yet to be explained below may be used not only in the stated combinations but also in other combinations or alone without departing from the scope of the present invention.

BRIEF DESCRIPTION OF THE DRAWINGS

The invention will be explained in more detail in the following with reference to drawings which also disclose key features of the invention. The drawings show.

The drawings are not to scale and are merely schematic diagrams.

DETAILED DESCRIPTION OF THE DRAWINGS

Figure 1:
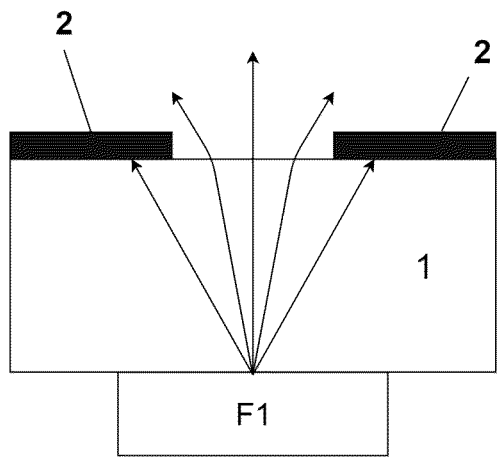
FIG. 1 a schematic diagram for explaining the method according to the invention in operating state B1.

FIG. 1 shows a schematic diagram for explaining the method according to the invention in operating state B1. In contrast, FIG. 2 shows operating state B2.

In the present method according to the invention for influencing the light propagation directions of a plurality of adjacent self-luminous and/or illuminated surfaces (F1, F2, . . . ) which comprise in each instance a transparent substrate 1 on the light exit side, every surface has its own substrate 1 in a first alternative or, in a second alternative, all of the surfaces (F1, F2, . . . ) use a common substrate 1. The aforementioned substrate 1 is arranged above, but not necessarily directly above, the light-generating layer of the self-luminous or illuminated surfaces (F1, F2, . . . ) as is shown in FIG. 1.

Figure 2:
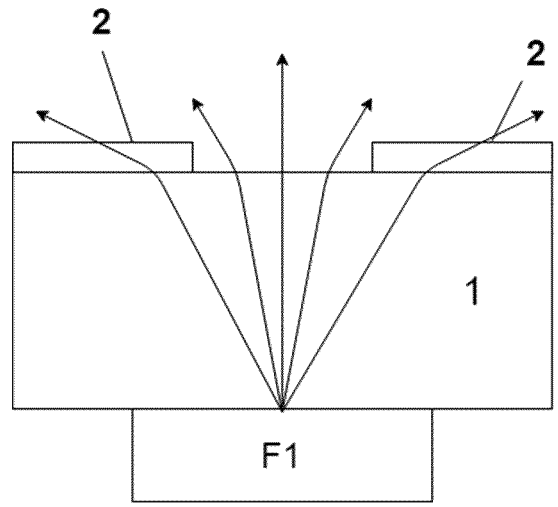
FIG. 2 a schematic diagram for explaining the method according to the invention in operating state B2.

The method according to the invention comprises the following steps:

for at least a quantity of surfaces (F1, F2, . . . ), arranging switchable absorbers 2 in each instance on the light exit side on one or more (strict) partial surfaces of the respective substrate 1 in the first alternative or on one or more partial surfaces of the common substrate 1 in the second alternative, the main spatial direction of propagation of these switchable absorbers 2 lying parallel to the light exit surface of the substrate 1 or substrates 1 to within a tolerance of a maximum of 10°, limiting the light propagations of the light emanating from each individual surface (F1, F2, . . . ) in such a way that light of a surface (F1, F2, . . . ) does not exit through the substrate 1 or the portion of a substrate 1 which is located in front of another surface in parallel projection, but only exits through the substrate portion 1 which, in parallel projection, is located exclusively in front of the surface under consideration (this will be explained in more detail later referring to FIG. 3 and FIG. 4), switching on the absorbent effect of the switchable absorbers 2 for a first operating state B1—as is shown in FIG. 1—so that a portion of the light emanating from the surfaces (F1, F2, . . . ) is absorbed, while the rest of the light exits freely at the surface portions of the light exit side of the substrate 1 at which no switchable absorbers 2 are applied, as a result of which the light of the respective relevant surfaces (F1, F2, . . . ) is only visible from a limited viewing angle which is defined in particular by the geometric shape of the switchable absorber 2, the geometric shape of the respective surface (F1, F2, . . . ), the refractive index conditions in the setup and the thickness of the substrate, switching off the absorbent effect of the switchable absorbers 2 for a second operating state B2—as is shown in FIG. 2—so that the light emanating from the surfaces (F1, F2, . . . )—with the exception of residual absorption losses of the switchable absorbers 2—can propagate freely through same, as a result of which the light of the respective relevant surfaces (F1, F2, . . . ) is visible from an unrestricted viewing angle (but at least from a larger viewing angle than in operating state B1).

In this first variant of the invention, as also in all of the following variants, a limited viewing angle does not necessarily mean that no light at all is emitted in certain directions. On the contrary, a certain residual light can also be emitted, although it impairs comfortable viewing. Typical values for such residual light (measured as luminance) even in zones intended for the limited view are a few percent of the peak value (which is perceptible from the dedicated viewing zone of the limited viewing angle).

In the first alternative, each surface (F1, F2, . . . ) comprises its own substrate 1 (or 1.1, 1.2, 1.3, etc., respectively). These substrates are then preferably arranged substantially in a plane. In contrast, in the second alternative, it is also possible that all of the surfaces (F1, F2, . . . ) comprise a common, two-dimensionally extensive substrate 1.

It is possible in particular either that the switchable absorbers 2 associated with all of the surfaces (F1, F2, . . . ) are switched simultaneously between operating states B1 and B2 for a full area switching or that switching is carried out over a partial area between the operating states B1 and B2 in that only a strict subset of the switchable absorbers 2 is switched.

Figure 3:
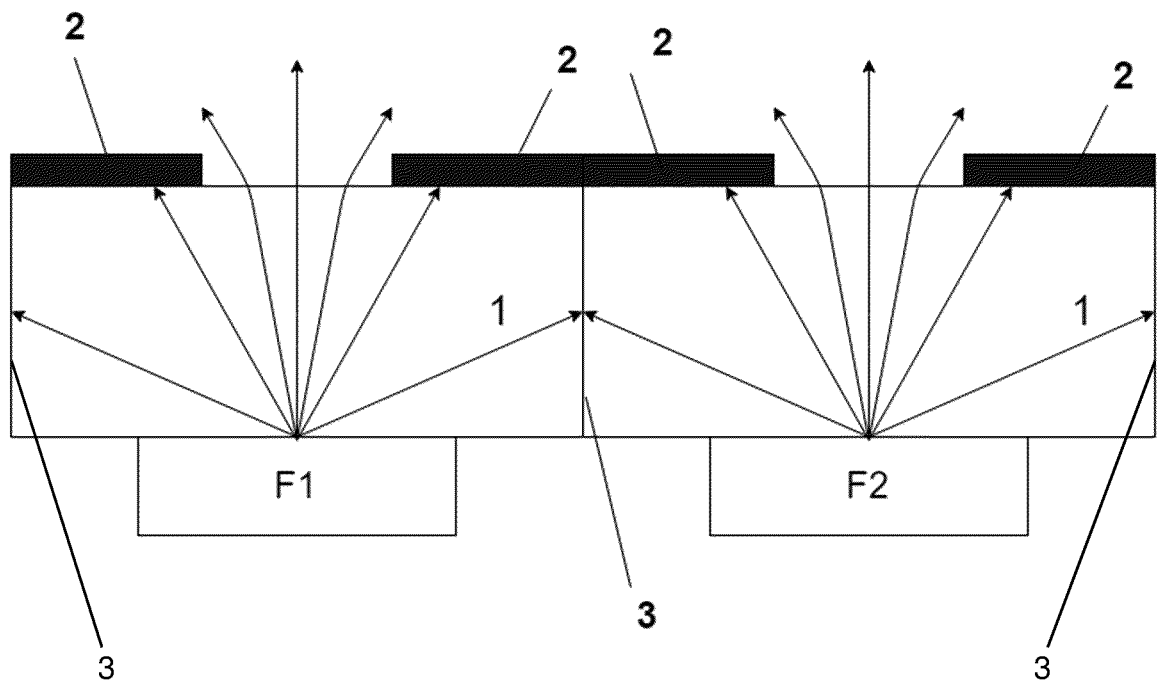
FIG. 3 a schematic diagram for explaining the limiting of obliquely directed rays in a first embodiment.

The above-mentioned limiting of the light propagations of the light emanating from each individual surface (F1, F2, . . . ) is carried out, for example, by arranging permanently absorbent layers 3 between the individual substrates 1 in the first alternative or inside of the one common substrate 1 in the second alternative. This approach is illustrated in FIG. 3 which shows a schematic diagram of the limiting of obliquely directed rays in a first embodiment. The absorbent layers 3 may comprise, for example, opaque particles in an adhesive, in silicon or a polymer. Alternatively, they can also comprise opaque solid material such as metal or one or more vapor-deposited layers. In accordance with the conditions shown in FIG. 3, light rays which are emitted, e.g., from surface F1 in direction of the substrate portion 1 located in front of surface F2 would be extinguished by the absorbent layer 3. The opposite is true for rays from surface F2 which are emitted in direction of the substrate portion 1 located in front of surface F1.

In a particular configuration, the absorbent layer 3 can also be switched between a transparent state and an absorbent state. The planes in which the switchable absorbers 2 and the (permanently or optionally switchable) layers 3 are arranged are preferably perpendicular to one another to within a tolerance of a maximum of 25 degrees.

Figure 4:
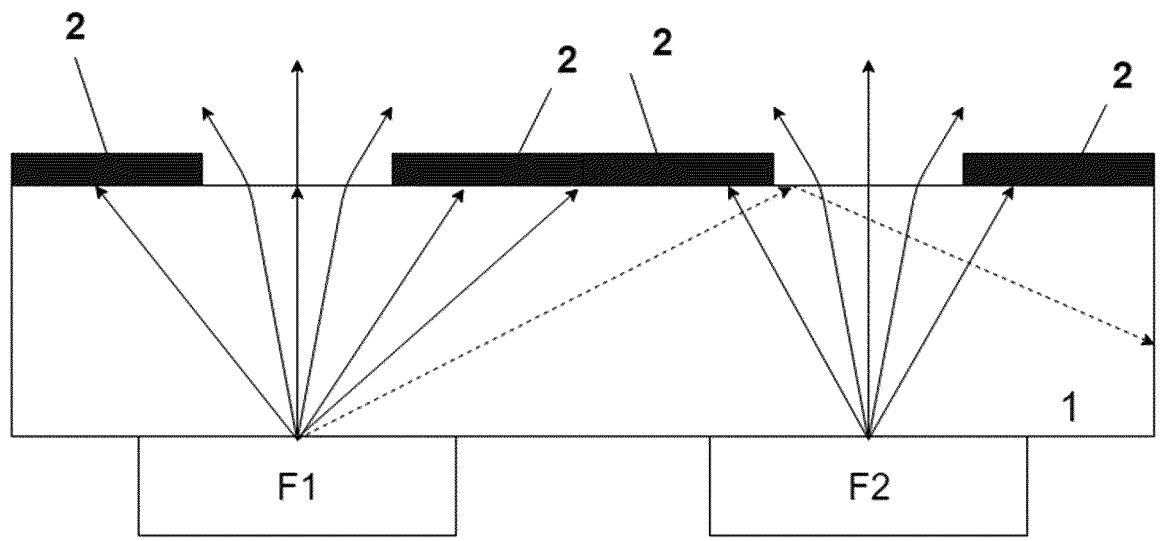
FIG. 4 a schematic diagram for explaining the limiting of obliquely directed rays in a second embodiment.

In contrast, FIG. 4 shows a schematic diagram of the limiting of obliquely directed rays in a second configuration. In this case, the limiting of the light propagations of the light emanating from each individual surface (F1, F2, . . . ) is carried out through selection of the refractive index conditions of the substrate 1 relative to air such that unwanted rays in direction of respective adjacent partial areas are converted into total reflection (indicated in FIG. 4 by the ray shown in dashes) and are accordingly extinguished for the light balance. In practice, a permanent absorber, not shown in the drawing, is then generally applied to the narrow sides of the substrate in order to absorb this light from the angles of total reflection.

Other variants of the above-mentioned limiting of obliquely directed rays are possible.

Figures 5, 6:
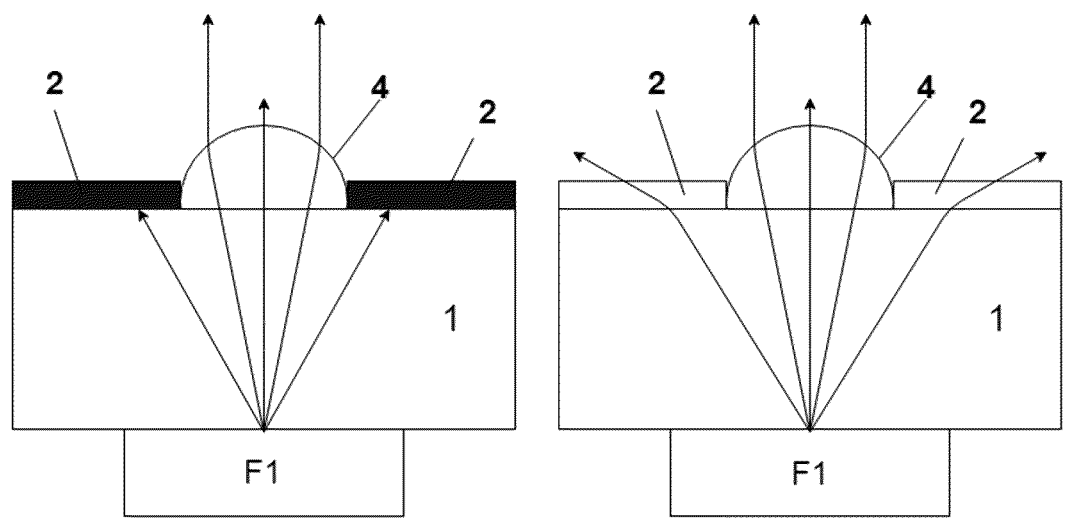
FIG. 5 a schematic diagram for explaining the method according to the invention in an expanded configuration in operating state B1.
FIG. 6 a schematic diagram for explaining the method according to the invention in an expanded configuration in operating state B2.

In a further development of the invention, a collimating lens 4 is arranged in each instance on the partial surfaces of the substrates 1 or substrate 1 to which there are no switchable absorbers applied so as to achieve a further beam focusing and better enable the limiting of the viewing angle. FIG. 5 shows a schematic diagram for explaining this variant in operating state B1, and FIG. 6 shows a schematic diagram in operating state B2.

Every switchable absorber 2 can comprise, for example, an electrochromic layer and/or a liquid crystal layer and/or an electrophoresis-based layer and/or a layer based on electrowetting with absorbent particles, each of which can be controlled by an electric field. The absorbent effect can easily be switched on and switched off in this way. It will be appreciated that controlling means, such as a controller, are available for this purpose.

In the case of electrochromic layers as absorbers 2, they can be inexpensively vapor deposited on the substrate 1 or substrates 1 and contacted with electrodes for control.

In a further embodiment, it is possible that every switchable absorber 2 comprises a switchable color filter which, in each instance, absorbs the color spectrum of the color emitted below through a surface (F1, F2, . . . ) in a first state and transmits it in a second state, the switchable color filter being controllable with respect to its state through an electric field. This can involve quantum dots, for example.

Every switchable absorber 2 preferably has the geometry of a pinhole diaphragm. It is explicitly possible that more than one (permanently) non-absorbent geometric portion is provided for each switchable absorber 2 or for each pinhole, respectively.

FIG. 7*a*-7*h* show various schematic diagrams in a top view depicting possible configuration variants of the switchable absorbers 2. When an absorber is arranged in each instance in front of each surface (F1, F2, . . . ) in accordance with one of the drawings in FIGS. 7*a*-7*h*, the light propagation directions are influenced in the following manner in operating state B1 compared with operating state B2 (assuming that an observer views the substrates 1 approximately around the perpendicular bisector thereof):

7*a*: limiting of the light propagation directions toward the left-hand side and right-hand side and at the top and bottom,

7*b*: limiting of the light propagation directions only toward the left-hand side and right-hand side, respectively,

7*c*: limiting of the light propagation directions only toward the left-hand side and right-hand side, respectively, the limiting toward the right-hand side being greater than that on the left-hand side,

7*d*: limiting of the light propagation directions toward the left-hand side and right-hand side and at the top and bottom, but with a conical propagation angle having a circular cross section,

7*e*: limiting of the light propagation directions in all directions above the substrate 1, but with a conical propagation angle having a hexagonal cross section,

7*f*: limiting of the light propagation directions in all directions above the substrate 1, but with a conical propagation angle having a circular cross section,

7*g*: limiting of the light propagation directions in all directions above the substrate 1, but with a conical propagation angle having two circular cross sections, and

7*h*: limiting of the light propagation directions toward the left-hand side and right-hand side and at the top and bottom such that light only arrives outside of a conical blocking angle having a circular cross section (so-called inverse pinhole shape).

In the above-mentioned drawings in FIGS. 7*a*-7*h*, the places where there are no absorber portions 2 are labeled as substrate 1. In particular, this is intended to illustrate that the absorbers 2 do not cover the entire surface area of the substrate 1 or substrates 1.

It is also possible that different switchable absorbers 2 have different geometric shapes as shown, for example, in two or more of the drawings in FIG. 7*a* to FIG. 7*h*. Often, however, all of the absorbers 2 have essentially the same geometric shape. When the same shape is applied to all of the absorbers 2, these absorbers 2 can be slightly elongated or compressed by a correction factor toward the edges.

Figure 7A:
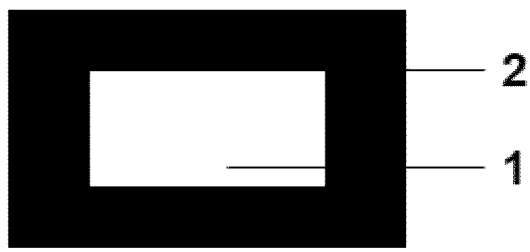
FIGS. 7a-7h schematic top views of possible configuration variants of the switchable absorbers.
Figure 7B:
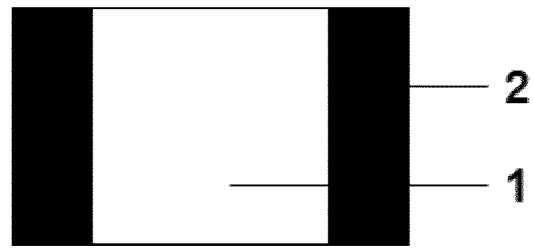
Figure 7C:
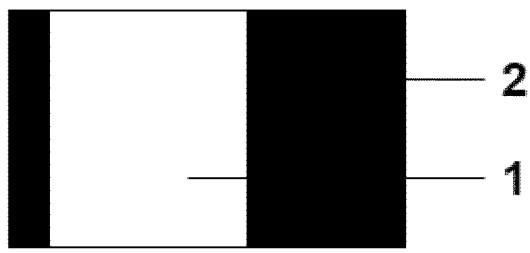
Figure 7D:
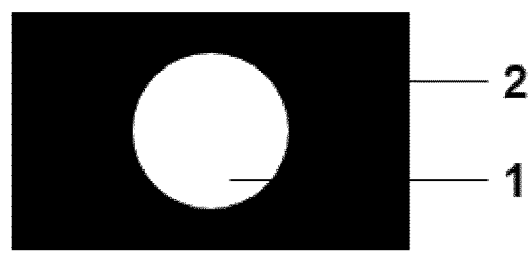
Figure 7E:
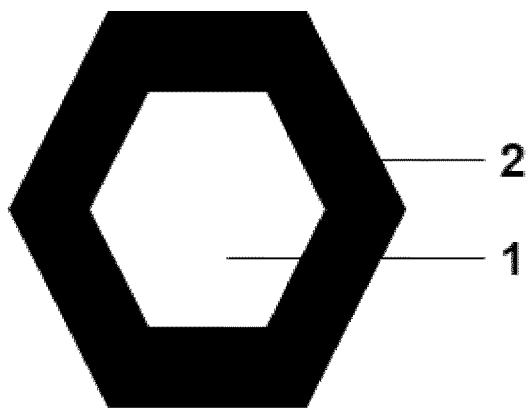
Figure 7F:
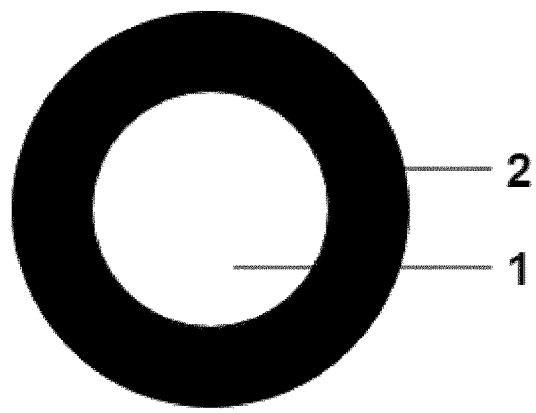
Figure 7G:
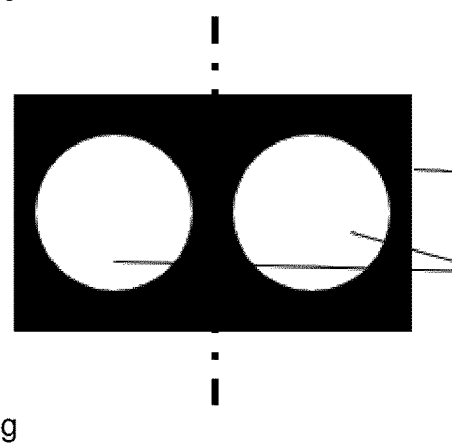
Figure 7H:
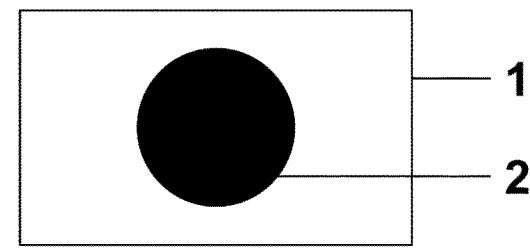

Further, an absorber 2 can have the geometry of an inverse pinhole diaphragm as is shown in FIG. 7*h* (inverse relative to FIG. 7*d*). In an inverse pinhole diaphragm of this kind, as opposed to a non-inverse pinhole diaphragm, those partial surfaces or zones of a substrate which would not otherwise be covered by a switchable absorber are covered by a switchable absorber, and vice versa. Such an inverse pinhole diaphragm is used in certain embodiment forms of the invention (see the description referring to FIG. 9a and FIG. 9b).

In absolute numbers, the surfaces of the absorbers 2 can have a size of several dozens of square micrometers to a few square millimeters or possibly even more, depending on the configuration of the surfaces (F1, F2, . . . ). Further configurations are contemplated and can be implemented according to the case of application.

The variants according to FIG. 7g can also be configured, for example, such that the left-hand portion of the absorber 2 (that is, the portion to the left of the dashed line) can be switched to absorbent for an operating state B5 and the other half on the right-hand side can be switched to transmission. The switching is inverted for operating state B6, i.e., the first-mentioned half of the absorber 2 is switched to transmissive and the second-mentioned half of the absorber 2 is switched to absorbent. Thus it is possible, e.g., that the light of the surfaces is alternately released in one direction and then in another direction in a cyclical timing of operating states B5 and B6. In other words, the operating states B5 and B6 are cycled in a clocked manner for a temporal-sequential influencing of the light direction. This can be utilized, for example, to generate images in two different directions, for example, in order to project two different temporally-sequentially displayed images consecutively and cyclically in different directions because of the method according to the invention. If this is performed fast enough, i.e., above the flicker fusion rate of the human eye, then, depending on the direction and image contents, either autostereoscopic displays (both eyes of an observer see two different images quasi-simultaneously) or two different images for two different observers (so-called dual view) are made possible simultaneously on the surfaces F1, F2, . . . .

Figure 11A:
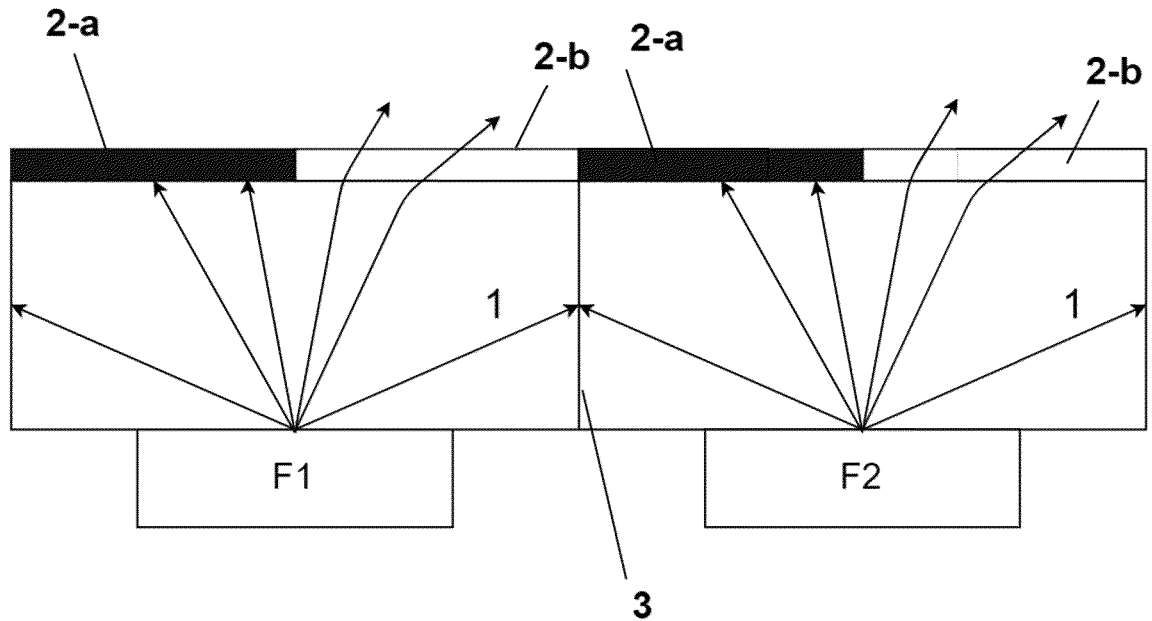
FIG. 11a and FIG. 11b schematic diagrams showing a configuration with operating states B5 and B6 in which, respectively, different images can be displayed in different directions.
Figure 11B:
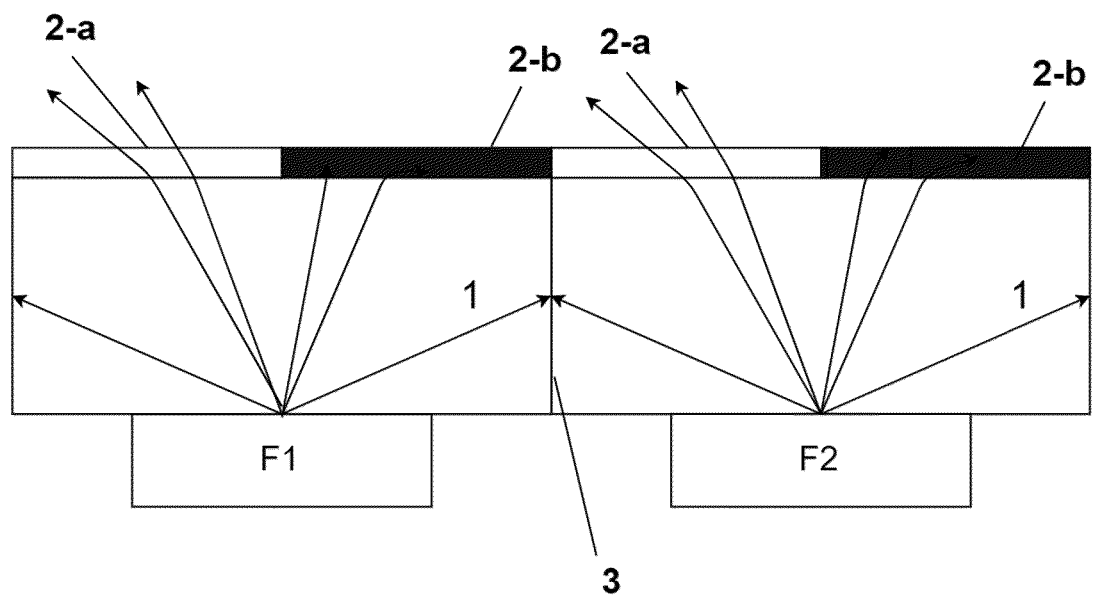

FIG. 11a and FIG. 11b show schematic diagrams relating to a configuration with operating states B5 and B6 in which different images can be displayed, respectively, in different directions. In other words, use is made in this embodiment of a method for influencing the light propagation directions of a plurality of adjacent self-luminous and/or illuminated surfaces F1, F2, . . . in which the surfaces F1, F2, . . . comprise a transparent substrate 1 on the light exit side, this substrate 1 being arranged above the light-generating layer of the self-luminous or illuminated surfaces F1, F2, . . . , and, in a first alternative, every surface F1, F2, . . . comprises its own substrate 1 and, in a second alternative, all of the surfaces F1, F2, . . . comprise a common, two-dimensionally extensive substrate 1, having the following steps:

for at least a quantity of surfaces F1, F2, . . . , arranging switchable absorbers 2 on the light exit side on one or more partial surfaces of the respective substrate 1 in the first alternative or on one or more partial surfaces of the common substrate 1 in the second alternative, the main spatial direction of propagation of these switchable absorbers 2 lying parallel to the light exit surface of the substrate 1 or substrates 1 to within a tolerance of a maximum of 10°, and at least two separately switchable absorbers 2 are provided in front of every surface F1, F2, . . . and can be switched, respectively, to transparent and opaque so as to complement one another in each instance, limiting the light propagations of the light emanating from each individual surface F1, F2, . . . in such a way that light of a surface F1, F2, . . . does not exit through the substrate 1 or the portion of a substrate 1 which is located in front of another surface in parallel projection, but only exits through the substrate portion 1 which, in parallel projection, is located exclusively in front of the surface under consideration, switching on the absorbent effect of a selection of switchable absorbers 2 and switching on the transparent effect of the selection of switchable absorbers 2 complementing the aforementioned selection of switchable absorbers 2 for an operating state B5 so that a portion of the light emanating from the surfaces F1, F2, . . . is absorbed, while the rest of the light exits freely at the surface portions of the light exit side of the substrate 1 at which no switchable absorbers 2 are applied or an absorber 2 switched to transparent is applied, as a result of which the light of the respective relevant surfaces F1, F2, . . . is only visible in each instance from a first limited viewing angle which is defined in particular by selection and the geometric shape of the switchable absorbers 2, the geometric shape of the respective surface F1, F2, . . . , the refractive index conditions in the setup, and the thickness of the substrate, switching on the transparent effect of the aforementioned selection of switchable absorbers 2 and switching on the absorbent effect of the selection of switchable absorbers 2 complementing the aforementioned selection of switchable absorbers 2 for an operating state B6 so that a portion of the light emanating from the surfaces F1, F2, . . . is absorbed, while the rest of the light exits freely at the surface portions of the light exit side of the substrate 1 at which no switchable absorbers 2 are applied or an absorber 2 switched to transparent is applied, so that the light of the respective relevant surfaces F1, F2, . . . is only visible in each instance from a second limited viewing angle which is defined in particular by the selection and the geometric shape of the switchable absorbers 2, the geometric shape of the respective surface F1, F2, . . . , the refractive index conditions in the setup, and the thickness of the substrate 1, operating states B5 and B6 are switched on one after the other in a cyclically timed manner, and at least two different image contents are displayed on the surfaces F1, F2, . . . alternately in the same cyclical timing, so that an autostereoscopic display or a dual view display is achieved on the surfaces F1, F2, . . . depending on the first limited viewing angle and second limited viewing angle and depending on the image contents displayed.

FIG. 11a shows operating state B5, in which, as a result of switchable absorbers 2-a which are switched to opaque in this instance, light rays are only passed rightward (i.e., through the switchable absorbers 2-b of the complementary selection which are switched to transparent). In this case also, the above-mentioned limiting of the light propagations of the light emanating from each individual surface (F1, F2, . . . ) is carried out, for example, through the arrangement of permanently absorbent layers 3 between the individual substrates 1 in the first alternative or inside of the one, common substrate 1 in the second alternative.

In contrast, FIG. 11b shows the next cycle with operating state B6, in which, as a result of the selection of switchable absorbers 2-b which are switched to opaque in this instance, light rays are only passed leftward (i.e., through the switchable absorbers 2-a of the complementary selection which are switched to transparent).

The method according to the invention acquires special practical significance when there is a plurality of self-luminous surfaces (F1, F2, . . . ) which correspond in each instance to a smallest pixel of an OLED display screen, mini-LED display screen, VCSEL display screen, QLED display screen, LED display screen or micro-LED display screen so that such a display screen can be switched between an operating state B1 for a limited viewing angle and an operating state B2 for an unrestricted viewing angle. Either RGB subpixels (red, green, blue), other monochromatic pixels or solid-color pixels are contemplated as smallest pixels depending on the configuration of display technology. In general, the display technology can be self-luminous or illuminated, for example, LCD, SED, FED or the like.

Figure 8:
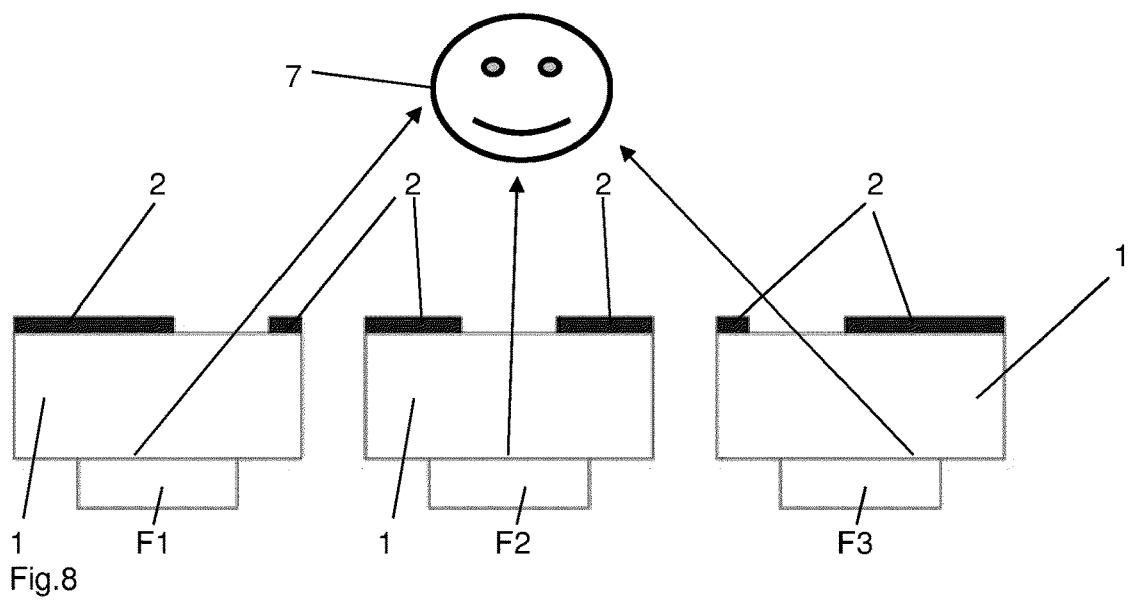
FIG. 8 a schematic diagram showing a configuration in which each switchable absorber has the geometry of a pinhole diaphragm and the geometric centroids shift from one surface to another.

In a further configuration shown in FIG. 8, every switchable absorber 2 has the geometry of a pinhole diaphragm. In this respect, it may be advantageous, depending on the application, to arrange the pinhole diaphragms on the partial surfaces or partial surface of the common substrate 1 or of the respective substrate 1 in such a way that the geometric centroids of the self-luminous or illuminated surfaces F1, F2, . . . and of the surface portions not covered by the switchable absorbers 2 do not coincide with one another in parallel projection at least in some of the surfaces F1, F2, . . . . This is illustrated in FIG. 8. In this way, it is brought about that the limited light propagation directions of the individual surfaces F1, F2, . . . are varied, namely, in an especially advantageous manner such that, when the surfaces F1, F2, . . . are viewed by an observer 7, the surfaces F1, F2, . . . at the left-hand edge radiate or emit light toward the right-hand side, i.e., toward the observer 7, and the surfaces F1, F2, . . . at the right-hand edge radiate or emit light toward the left-hand side, i.e., again toward the observer 7. An improved homogeneity can be achieved in this way in spite of limited light directions.

FIG. 8 shows such an optimization of light direction of the surfaces F1, F2, F3 toward an observer 7. Since this is only a schematic diagram, only three surfaces F1, F2, F3 are shown which represent surfaces on the left, in the middle and on the right in a corresponding implementation. In actuality, however, there is a multitude of such self-luminous or illuminated surfaces F1, F2, F3, . . . . The above-described displacement of the geometric centroids of the self-luminous or illuminated surfaces F1, F2, . . . over the entirety of these surfaces takes place gradually as will be appreciated by the person skilled in the art.

FIG. 8 further shows the surfaces F1, F2, F3 spaced apart. They can, in fact, be spaced apart but need not be.

Figures 9A, 9B:
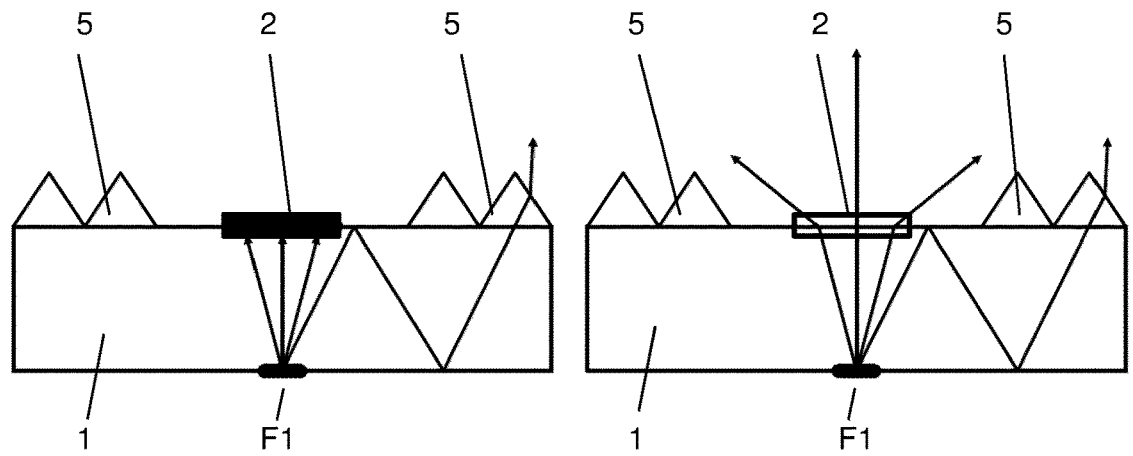
FIG. 9a and FIG. 9b schematic diagrams showing a configuration in which an inverse pinhole diaphragm is used and in which totally internally reflected rays are used.

In a further configuration which is shown as schematic diagram in FIG. 9a and FIG. 9b, each switchable absorber 2 has the geometry of an inverse pinhole diaphragm (as is shown, for example, in FIG. 7h). With an inverse pinhole diaphragm of this kind, as opposed to a non-inverse pinhole diaphragm, those partial surfaces or zones of a substrate 1 which would not otherwise be covered by a switchable absorber 2 are covered by a switchable absorber 2, and vice versa.

Accordingly, in a configuration according to FIG. 9a in which a switchable absorber is arranged substantially facing the self-luminous or illuminated surface F1 the operating state B1 for a limited mode is shown. The light emitted from surface F1 is now absorbed by the switchable absorber 2. However, rays which are totally internally reflected in the substrate 1 arrive inside the substrate 1 spatially adjacent to the absorber 2.

A further particular of this configuration consists in that microstructured outcoupling elements 5 which couple the above-mentioned totally internally reflected rays out of the common substrate 1 or out of the respective substrate 1 accompanied by a change in direction are arranged on partial surfaces not covered by the absorbers 2, and the light coupled out through the microstructured outcoupling elements 5 is only visible from the limited viewing angle. This is indicated in FIG. 9a by the light ray which is coupled out upward.

On the other hand, if this configuration is switched to operating state B2 as is shown in FIG. 9b, i.e., the absorber 2 is transparent, an observer is reached not only by light due to the outcoupling elements 5, but also directly by the light of surface F1 which—except for losses due to technical reasons—can now pass the absorber 2.

To this extent, this configuration operates somewhat differently than any of the configurations described above because, in this case, the distribution of the absorbers 2 in the form of an inverse pinhole diaphragm and the use of totally internally reflected rays come into play.

Figures 10A, 10B:
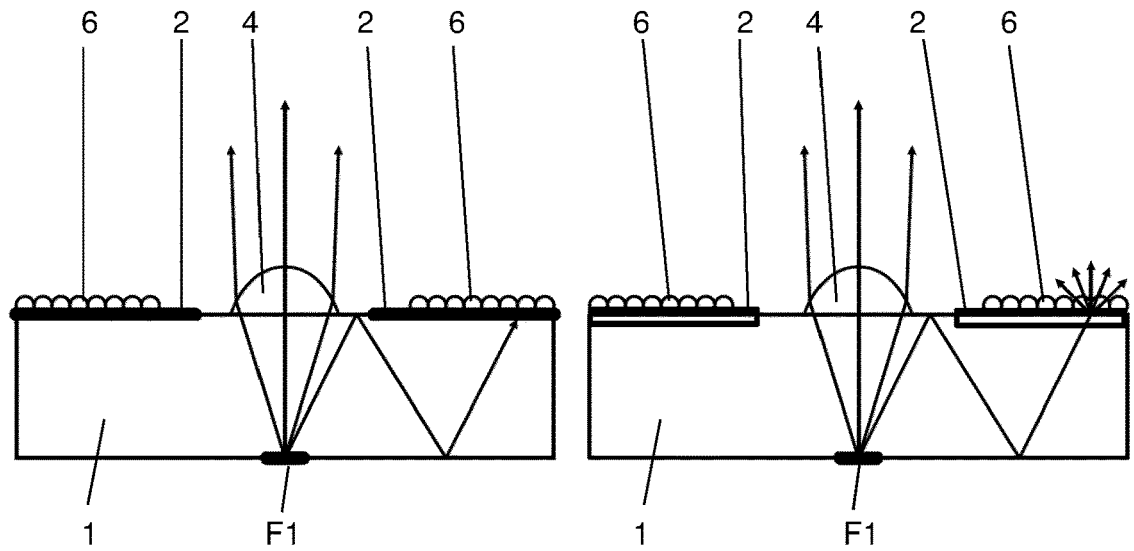
FIG. 10a and FIG. 10b schematic diagrams showing a configuration in which permanently scattering microstructures are used on the switchable absorbers.

Lastly, the drawings in FIGS. 10a and 10b show further configurations in which permanently scattering microstructures 6 are arranged on the switchable absorbers 2. While the schematic diagrams in FIG. 10a and FIG. 10b can be seen as corresponding further developments of the configurations according to FIG. 5 and FIG. 6, the use of permanently scattering microstructures 6 on the switchable absorbers provides effective means for all of the described configurations to optimize the light distribution particularly for operating state B2. According to FIG. 10a, the scattering microstructures 6 do not take effect in operating state B1 because the absorbers 2 are switched to absorbent in operating state B1 and, therefore, effectively no light, or virtually no light, of a surface F1 reaches the scattering microstructures 6. In contrast, FIG. 10b shows that in operating state B2, in which the switchable absorbers 2 are switched to transparent, the scattering microstructures 6 scatter light reaching the switchable absorbers 2 from totally internally reflected light (and, depending on position, not shown here) possibly also light directly from the surface F1 in order to optimize the light distribution, particularly for operating state B2, through scattering.

The arrangement according to the invention for influencing the light propagation directions can also be illustrated referring to FIG. 1 and FIG. 2. This arrangement comprises:
  a plurality of adjacent self-luminous and/or illuminated surfaces (F1, F2, . . . ) which comprise (in each instance) a transparent substrate 1 on the light exit side, the aforementioned substrate 1 being arranged above the light-generating layer of the self-luminous or illuminated surfaces (F1, F2, . . . ), and, in a first alternative, every surface (F1, F2, . . . ) has its own substrate (1) and, in a second alternative, all of the surfaces (F1, F2, . . . ) comprise a common, two-dimensionally extensive substrate (1),
  for at least a quantity of surfaces (F1, F2, . . . ), switchable absorbers 2 arranged in each instance on the light exit side on one or more partial surfaces of the respective substrate 1 in the first alternative or on one or more partial surfaces of the common substrate (1) in the second alternative, the main spatial direction of propagation of these switchable absorbers 2 lying parallel to the light exit surface of the substrate 1 or substrates 1 to within a tolerance of a maximum of 10°,
  means for limiting the light propagations of the light emanating from each individual surface (F1, F2, . . . ) such that light of a surface (F1, F2, . . . ) does not exit through the substrate 1 or the portion of a substrate 1 located in front of another surface in parallel projection, but only exits through the substrate portion 1 which, in parallel projection, is located exclusively in front of the surface under consideration, these solutions being shown in exemplary manner in FIG. 3 and FIG. 4, means, such as a switch (not shown), for switching on and switching off the absorbent effect of the switchable absorbers 2 such that the absorbent effect of the switchable absorbers 2 is switched on for a first operating state B1, as is shown in FIG. 1, so that a portion of the light emanating from the surfaces (F1, F2, . . . ) is absorbed, while the rest of the light exits freely at the surface portions of the light exit side of the substrate 1 on which no switchable absorbers 2 are applied, as a result of which the light of the respective relevant surfaces (F1, F2, . . . ) is only visible in each instance from a limited viewing angle which is defined in particular by the geometric shape of the switchable absorber 2, the geometric shape of the respective surface (F1, F2, . . . ), the refractive index conditions in the setup, and the thickness of the substrate 1, and so that the absorbent effect of the switchable absorbers 2 is switched off for a second operating state B2, as is shown in FIG. 2, as a result of which the light emanating from the surfaces (F1, F2, . . . ), with the exception of residual absorption losses of the switchable absorbers 2, can freely propagate through the same, as a result of which the light of the respective relevant surfaces (F1, F2, . . . ) is visible from an unrestricted viewing angle.

The configuration variants and interrelationships of means and effect which were mentioned above apply analogously and are not described again so as to avoid repetition.

The above-stated object is met by the above-described method according to the invention and the arrangement according to the invention for influencing the light propagation directions. Both the method and the arrangement can be implemented so as to be inexpensive and suitable for mass production and, in particular, are universally usable with OLED display screens but also with other types of display screen in order to enable switching between a privacy mode and a public mode, and the resolution of such a display screen is not appreciably reduced.

The invention described above can advantageously be used in cooperation with an image reproduction device anywhere that confidential data are displayed and/or entered, such as when entering a PIN number or displaying data in automatic teller machines or payment terminals or for entering passwords or when reading emails on mobile devices. The invention can also be applied in passenger cars in order to make selectable contents visible to the driver or, alternatively, not to burden the driver with distracting image contents. Further cases of application lie within the field of lighting and advertisement, in particular for preventing light pollution.

The invention claimed is:

1. A method for influencing light propagation directions of a plurality of adjacent self-luminous and/or illuminated surfaces which comprise a transparent substrate on a light exit side, wherein the substrate is arranged above a layer of the self-luminous or illuminated surfaces which generates light, and wherein, in a first alternative, each surface comprises its own substrate and, in a second alternative, all of the surfaces comprise a common, two-dimensionally extensive substrate, comprising the following steps:

arranging, for at least a quantity of the surfaces, switchable absorbers in each instance on the light exit side on one or more partial surfaces of the respective substrate in the first alternative or on one or more partial surfaces of the common substrate in the second alternative, wherein a main spatial direction of propagation of the switchable absorbers lies parallel to the light exit surface of the substrate or substrates to within a tolerance of a maximum of 10°, limiting the light propagations of the light emanating from each individual surface in such a way that light of a surface does not exit through the substrate or the portion of a substrate which is located in front of another surface in parallel projection, but only exits through the substrate portion which, in parallel projection, is located exclusively in front of the surface under consideration, switching on the absorbent effect of the switchable absorbers for a first operating state B1 so that a portion of the light emanating from the surfaces is absorbed, while the rest of the light exits freely at the surface portions of the light exit side of the substrate at which no switchable absorbers are applied, as a result of which the light of the respective relevant surfaces is only visible in each instance from a limited viewing angle which is defined by a geometric shape of the switchable absorber, a geometric shape of the respective surface, refractive index conditions in a setup and thickness of the substrate, switching off the absorbent effect of the switchable absorbers for a second operating state B2 so that the light emanating from the surfaces, with the exception of residual absorption losses of the switchable absorbers, can propagate freely through same, as a result of which the light of the respective relevant surfaces is visible from an unrestricted viewing angle.

2. The method according to claim 1, wherein either the switchable absorbers associated with all of the surfaces are switched simultaneously between operating states B1 and B2 for a full area switching or in that switching between the operating states B1 and B2 is carried out only over a partial area in that only a strict subset of the switchable absorbers is switched.

3. The method according to claim 1, wherein the limiting of the light propagations of the light emanating from each individual surface is carried out by arranging permanently or switchably absorbent layers between the individual substrates in the first alternative or inside of the one common substrate in the second alternative, wherein planes in which the switchable absorbers and the absorbent layers are arranged, respectively, and extend perpendicular to one another to within a tolerance of, at most, 25 degrees.

4. The method according to claim 1, wherein the limiting of the light propagations of the light emanating from each individual surface is carried out by selecting the refractive index conditions of the substrate relative to air in such a way that unwanted rays are converted into total reflection.

5. The method according to claim 1, wherein a collimating lens is arranged on the partial surfaces of the substrates or substrate on which no switchable absorber is applied in order to achieve a further beam focusing.

6. The method according to claim 1, wherein every switchable absorber comprises an electrochromic layer and/or a liquid crystal layer and/or an electrophoresis-based layer and/or a layer based on electrowetting with absorbent particles which can be controlled by an electric field.

7. The method according to claim 1, wherein every switchable absorber comprises a switchable color filter by which a color spectrum of the color emitted through a surface thereunder is absorbed in a first state and transmitted in a second state, and wherein the switchable color filter can be controlled with respect to its state by an electric field.

8. The method according to claim 1, wherein every switchable absorber has a geometry of a pinhole diaphragm or an inverse pinhole diaphragm.

9. The method according to claim 1, wherein there is provided a multitude of self-luminous or illuminated surfaces which, in their entirety, form a display screen, so that the display screen can be switched between the operating state B1 for a limited viewing angle and the operating state B2 for an unrestricted viewing angle.

10. The method according to claim 9, wherein the self-luminous surfaces correspond in each instance to a smallest pixel or a cluster of smallest pixels of an OLED display screen, mini-LED display screen, VCSEL display screen, QLED display screen, LED display screen or micro-LED display screen.

11. The method according to claim 9, wherein every switchable absorber has a geometry of a pinhole diaphragm, and the pinhole diaphragms are arranged on the partial surface or the partial surfaces of the common substrate or of the respective substrate such that geometric centroids of the self-luminous or illuminated surfaces and of the surface portions not covered by the switchable absorbers do not coincide with one another in parallel projection at least in some of the surfaces.

12. The method according to claim 9, wherein the illuminated surfaces correspond in each instance to a smallest pixel or a cluster of smallest pixels of an LCD display screen.

13. The method according to claim 1, wherein every switchable absorber has a geometry of an inverse pinhole diaphragm, and microstructured outcoupling elements which couple the totally internally reflected rays out of the common substrate or respective substrate accompanied by a change in direction are arranged on partial surfaces not covered by the absorbers, and wherein the light coupled out through the microstructured outcoupling elements is only visible from the limited viewing angle.

14. The method according to claim 1, wherein permanently scattering microstructures are arranged on the switchable absorbers.

15. The method according to claim 14, wherein the scattering microstructures couple out and/or scatter totally internally reflected rays in a substrate.

16. Use of the method of claim 1 in a planar illumination source comprising self-luminous or illuminated surfaces for backlighting an LCD panel so that the LCD panel can be operated in the first operating state B1 for a limited viewing angle and in the second operating state B2 for an unrestricted viewing angle.

17. An arrangement for influencing light propagation directions, comprising:
a plurality of adjacent self-luminous and/or illuminated surfaces which comprise a transparent substrate on a light exit side, wherein the substrate is arranged above a layer of the self-luminous or illuminated surfaces which generates light, and wherein, in a first alternative, every surface has its own substrate (1), and, in a second alternative, all of the surfaces comprise a common, two-dimensionally extensive substrate,
for at least a quantity of surfaces, switchable absorbers arranged on the light exit side in each instance on one or more partial surfaces of the respective substrate in the first alternative or on one or more partial surfaces of the common substrate in the second alternative, wherein a main spatial direction of propagation of these switchable absorbers lies parallel to the light exit surface of the substrate or substrates to within a tolerance of a maximum of 10°,
a light limiter for limiting the light propagations of the light emanating from each individual surface such that light of a surface does not exit through the substrate or the portion of a substrate that is located in front of another surface in parallel projection, but only exits through the substrate portion which, in parallel projection, is located exclusively in front of the surface under consideration,
a switch for switching on and switching off the absorbent effect of the switchable absorbers such that:
the absorbent effect of the switchable absorbers is switched on for a first operating state B1 so that a portion of the light emanating from the surfaces is absorbed, while the rest of the light exits freely at the surface portions of the light exit side of the substrate at which no switchable absorbers are applied, so that the light of the respective relevant surfaces is only visible in each instance from a limited viewing angle which is defined in particular by a geometric shape of the switchable absorber, a geometric shape of the respective surface, refractive index conditions in a setup, and a thickness of the substrate, and so that
the absorbent effect of the switchable absorbers is switched off for a second operating state B2 so that the light emanating from the surfaces, with the exception of residual absorption losses of the switchable absorbers can propagate freely through same, as a result of which the light of the respective relevant surfaces is visible from an unrestricted viewing angle.

18. A method for influencing the light propagation directions of a plurality of adjacent self-luminous and/or illuminated surfaces which comprise a transparent substrate on the light exit side, wherein the aforementioned substrate is arranged above the light-generating layer of the self-luminous or illuminated surfaces, and wherein, in a first alternative, every surface comprises its own substrate and, in a second alternative, all of the surfaces comprise a common, two-dimensionally extensive substrate, having the following steps:
arranging, for at least a quantity of surfaces, switchable absorbers on a light exit side on one or more partial surfaces of the respective substrate in the first alternative or on one or more partial surfaces of the common substrate in the second alternative, wherein the main spatial direction of propagation of these switchable absorbers lies parallel to the light exit surface of the substrate or substrates to within a tolerance of a maximum of 10°, and wherein at least two separately switchable absorbers are provided in front of every surface and can be switched, respectively, to transparent and opaque so as to complement one another,
limiting the light propagations of the light emanating from each individual surface in such a way that light of a surface does not exit through the substrate or the portion of a substrate which is located in front of another surface in parallel projection, but only exits through the substrate portion which, in parallel projection, is located exclusively in front of the surface under consideration,
switching on the absorbent effect of a selection of switchable absorbers and switching on the transparent effect of the selection of switchable absorbers complementing the aforementioned selection of switchable absorbers for an operating state B5 so that a portion of the light emanating from the surfaces is absorbed, while the rest of the light exits freely at the surface portions of the light exit side of the substrate at which no switchable absorbers are applied or an absorber switched to transparent is applied, as a result of which the light of the respective relevant surfaces is only visible in each instance from a first limited viewing angle which is defined in particular by selection and a geometric shape of the switchable absorbers, a geometric shape of the respective surface, refractive index conditions in a setup, and a thickness of the substrate, switching on the transparent effect of the aforementioned selection of switchable absorbers and switching on the absorbent effect of the selection of switchable absorbers complementing the aforementioned selection of switchable absorbers for an operating state B6 so that a portion of the light emanating from the surfaces is absorbed, while the rest of the light exits freely at the surface portions of the light exit side of the substrate at which no switchable absorbers are applied or an absorber switched to transparent is applied, so that the light of the respective relevant surfaces is only visible in each instance from a second limited viewing angle which is defined by a selection and a geometric shape of the switchable absorbers, a geometric shape of the respective surface, refractive index conditions in a setup, and a thickness of the substrate, switching operating states B5 and B6 one after the other in a cyclically timed manner, and displaying at least two different image contents on the surfaces alternately in the same cyclical timing, so that an autostereoscopic display or a dual view display is achieved on the surfaces depending on the first limited viewing angle and second limited viewing angle and depending on image contents displayed.

* * * * *

UNITED STATES PATENT AND TRADEMARK OFFICE
CERTIFICATE OF CORRECTION

| | | |
|---|---|---|
| PATENT NO. | : 12,147,123 B2 | Page 1 of 1 |
| APPLICATION NO. | : 17/758614 | |
| DATED | : November 19, 2024 | |
| INVENTOR(S) | : André Heber and Andreas Bregulla | |

It is certified that error appears in the above-identified patent and that said Letters Patent is hereby corrected as shown below:

In the Specification

In Column 12, Line 11, delete "FIG." and insert -- FIGS. --, therefor.

In the Claims

In Column 18, Claim 2, Line 37, after "or" delete "in that".

Signed and Sealed this
Eighteenth Day of February, 2025

Coke Morgan Stewart
*Acting Director of the United States Patent and Trademark Office*